US011761822B2

(12) United States Patent
Jenz et al.

(10) Patent No.: US 11,761,822 B2
(45) Date of Patent: Sep. 19, 2023

(54) METHOD FOR CHANGING A WORKING FLUID IN AN EXPANSION SYSTEM, AND EXPANSION SYSTEM

(71) Applicant: E.G.O. Elektro-Geraetebau GmbH, Oberderdingen (DE)

(72) Inventors: Christoph Jenz, Oberderdingen (DE); Martin Roth, Kraichtal (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 1062 days.

(21) Appl. No.: 16/220,515

(22) Filed: Dec. 14, 2018

(65) Prior Publication Data
US 2019/0187001 A1 Jun. 20, 2019

(30) Foreign Application Priority Data

Dec. 19, 2017 (DE) ...................... 10 2017 223 290.0

(51) Int. Cl.
*H01H 37/00* (2006.01)
*H01H 37/02* (2006.01)
(Continued)

(52) U.S. Cl.
CPC ...... *G01K 1/08* (2013.01); *C08J 3/24* (2013.01); *G01K 5/08* (2013.01); *G01K 5/12* (2013.01);
(Continued)

(58) Field of Classification Search
CPC .... G01K 1/08; G01K 5/08; G01K 5/12; C08J 3/24; H01H 35/26; H01H 35/2671; H01H 37/00; H01H 37/02; H01H 37/36
(Continued)

(56) References Cited

U.S. PATENT DOCUMENTS 2,840,669 A 6/1958 Russell
2,919,320 A * 12/1959 Edwards, Jr. ........ H01H 35/346
29/454

(Continued)

FOREIGN PATENT DOCUMENTS

DE 4006903 A1 9/1991
EP 0005191 A1 11/1979
(Continued)

OTHER PUBLICATIONS

European Patent Office, European Search Report for European Patent Application No. 18206861.9, dated May 20, 2019, 6 pages, Germany.

*Primary Examiner* — Anatoly Vortman
(74) *Attorney, Agent, or Firm* — Alston & Bird LLP

(57) ABSTRACT

An expansion system for temperature detection by means of thermomechanical expansion and movement has an expansion receptacle, an elongate fluid line which is connected in a fluid-conducting manner thereto, and a switching means which is mechanically operatively connected to the expansion receptacle for the purpose of actuation of a switching process of the switching means at a settable actuation point. A working fluid is contained in the expansion receptacle and in the fluid line. Furthermore, an activation material which is formed to change, upon contact with the working fluid or upon mixing with the working fluid, said working fluid with regard to its volume and/or its flowability is contained in the expansion system.

5 Claims, 5 Drawing Sheets

(51) Int. Cl.
*H01H 37/36* (2006.01)
*G01K 1/08* (2021.01)
*G01K 5/08* (2006.01)
*G01K 5/12* (2006.01)
*C08J 3/24* (2006.01)
*H01H 35/26* (2006.01)

(52) U.S. Cl.
CPC ........ *H01H 35/26* (2013.01); *H01H 35/2671* (2013.01); *H01H 37/00* (2013.01); *H01H 37/02* (2013.01); *H01H 37/36* (2013.01)

(58) Field of Classification Search
USPC .......................... 337/117, 119, 306, 320–322
See application file for complete search history.

(56) References Cited

U.S. PATENT DOCUMENTS

| | | | | |
|---|---|---|---|---|
| 3,882,439 A | * | 5/1975 | Wolfe | .................... H01H 37/32 337/321 |
| 3,883,837 A | * | 5/1975 | Wolfe | .................... H01H 37/36 337/326 |
| 4,160,225 A | | 7/1979 | Durst | |
| 4,260,977 A | | 4/1981 | Kicherer et al. | |
| 4,841,271 A | * | 6/1989 | Purssell | ............... H01H 35/343 200/83 Z |
| 5,358,288 A | | 10/1994 | Lindner et al. | |
| 5,467,523 A | * | 11/1995 | Seaman | ............... H01H 35/265 337/321 |
| 6,260,977 B1 | | 7/2001 | Inagaki | |
| 6,819,216 B2 | * | 11/2004 | Onishi | ............. G05D 23/27537 337/306 |

FOREIGN PATENT DOCUMENTS

| | | |
|---|---|---|
| EP | 0529419 A2 | 3/1993 |
| EP | 0822341 A2 | 2/1998 |
| WO | WO 2006/024451 A1 | 3/2006 |

\* cited by examiner

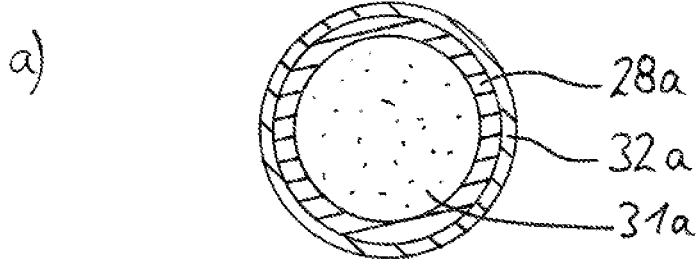
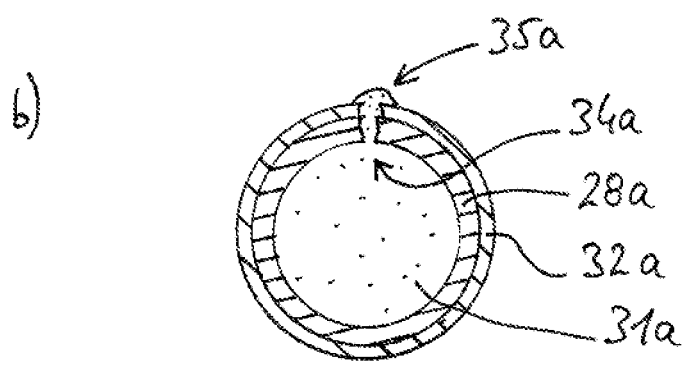
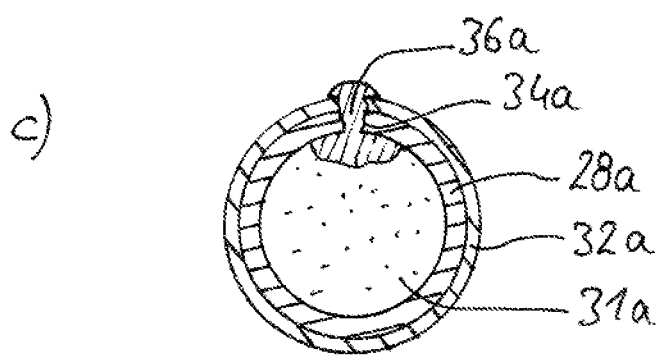
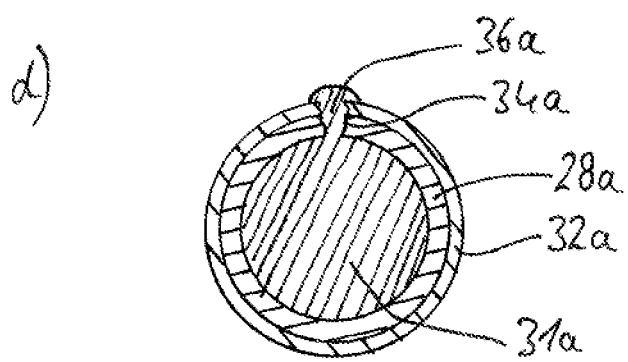
Fig.2

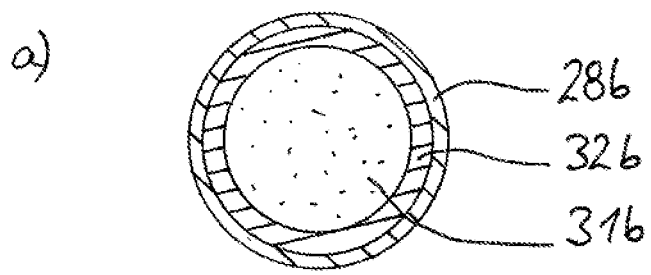
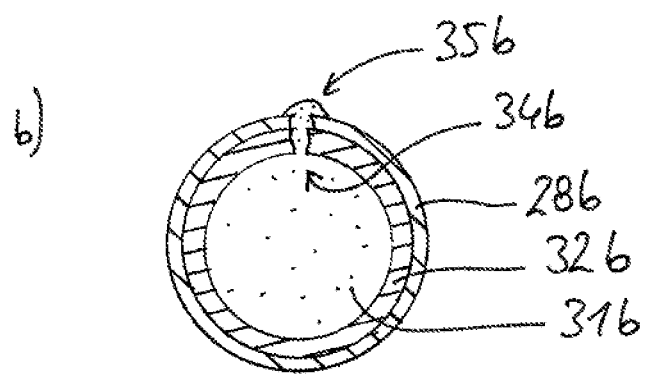
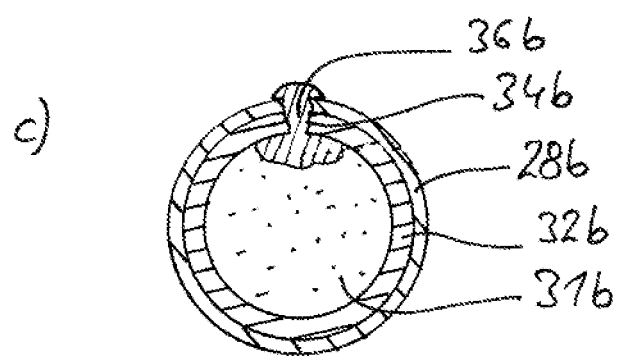
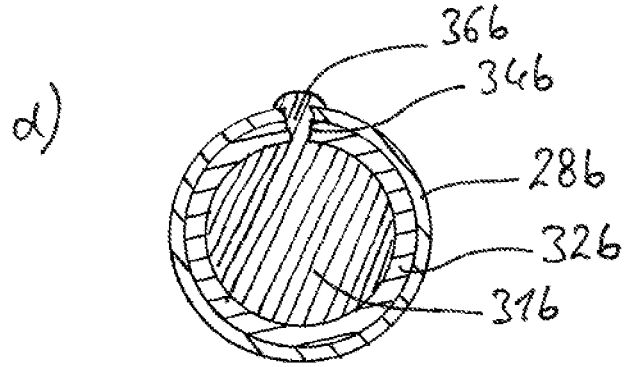
Fig.3

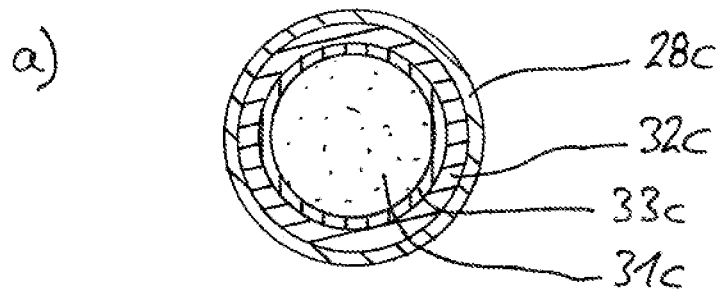
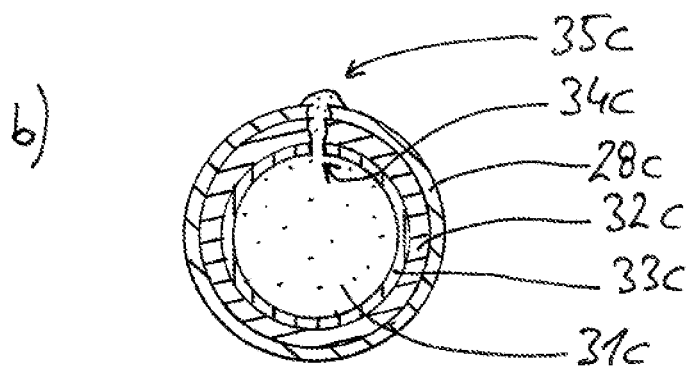
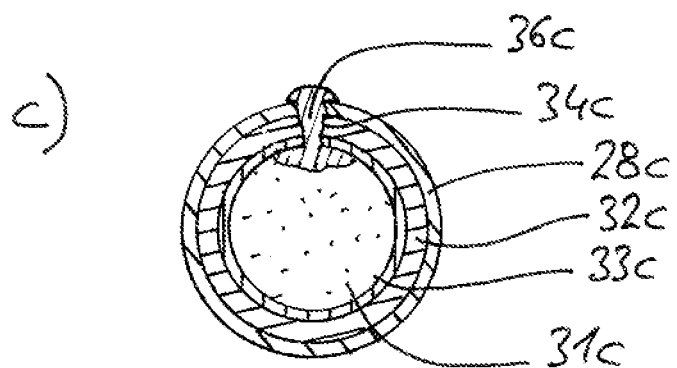
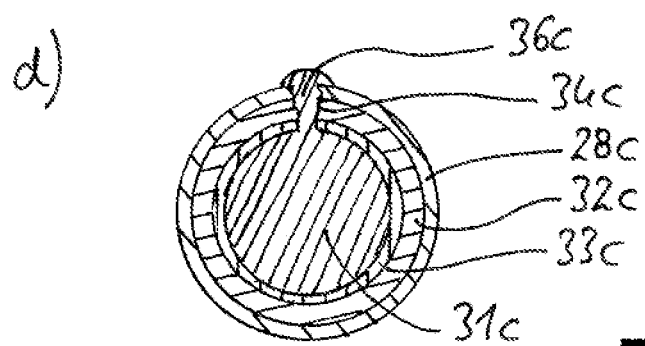
Fig.4

METHOD FOR CHANGING A WORKING FLUID IN AN EXPANSION SYSTEM, AND EXPANSION SYSTEM

FIELD OF APPLICATION AND PRIOR ART

The invention relates to a method for changing a working fluid in an expansion system which is used for temperature detection by means of thermomechanical expansion and movement. The invention also relates to such an expansion system in various configurations.

Such an expansion system for temperature detection is known from U.S. Pat. No. 4,260,977 A. The expansion system has a thin tube as a fluid line, at the external end of which tube there is provided a type of supply receptacle in which a relatively large quantity of working fluid can be contained. At the other end, the fluid line is connected in a fluid-conducting manner to an expansion receptacle, which is in the form of a so-called expansion cell and has, substantially in a planar configuration, two thin corrugated metal sheets which are selected to be corresponding and concentric and have a slight spacing with respect to one another. The working fluid has a specific expansion depending on the temperature, which expansion varies with varying temperature. This is then converted thermomechanically into a movement of the expansion receptacle or the expansion cell in order thereby then to trigger a switching process, or to close or to open a contact, at a specific temperature value and after a specific travel.

Problems can arise if the fluid line breaks or becomes leaky. Specifically, working fluid can then discharge, with in some cases the fluid discharge being a very large amount thereof. This leads to the expansion receptacle contracting, which corresponds to the process in which a detected temperature becomes very low. This in turn means that, in the case of a critical or predefined temperature reached by a monitored and temperature-regulated heating system, there is no longer any switching-off by the thermostat and thus an uncontrolled heating process is present and damage can occur. Since the fluid line is simply a thin metal tube, such a risk exists, for example also in the case that said tube is bent or kinked repeatedly and/or to an unacceptable degree.

Problem and Solution

The invention is based on the object of providing a method stated in the introduction and an expansion system stated in the introduction, by way of which problems of the prior art can be solved. It is in particular possible to increase the safety of the expansion system or of a temperature detection by way of the expansion system and to avoid faults or, even in the case of damage to the expansion system, in particular by way of the possible consequence of a discharge of working fluid, to achieve an increased level of safety.

This object is achieved by a method having the features set forth in the broadest accompanying claims. Advantageous and preferred configurations of the invention form the subject matter of the further claims and are explained in more detail below. Here, some of the features are described only for the method or only for the expansion system. However, they are intended to be applicable, independently of this, both to the method and to the expansion system independently of one another. The wording of the claims is incorporated into the content of the description by express reference.

In the method according to the invention for changing a working fluid in an expansion system for temperature detection, which in particular also triggers a contact process or a switching process, wherein the temperature detection is realized by means of thermomechanical expansion and movement, the expansion system contains a working fluid or has the working fluid. Furthermore, an activation material for changing the working fluid is provided, in particular provided in or applied to the expansion system, or contained in the working fluid and then preferably so as to be encapsulated.

It is provided that, upon contact with the working fluid or upon mixing with the working fluid, the activation material changes said working fluid or is itself changed, specifically with regard to a volume of the working fluid and/or a flowability of the working fluid or the viscosity thereof or of the mixture of working fluid and activation material or merely of the activation material alone. It is thus possible for a type of safety means or emergency means to be created with this special activation material, which comes into play or acts if the expansion system exhibits a faulty state or is impaired or damaged, in some cases even destroyed. This allows the degree of operational safety to be increased considerably. The activation material is especially selected such that it exhibits or can bring about this function, wherein, for this purpose, there are a number of different basic options. These will be explained in more detail below with regard to the different associated configurations.

In a first basic configuration of the invention, it may be provided that the activation material is of such a form that it changes only the flowability or the viscosity of the working fluid. In particular, the activation material can greatly reduce the flowability or greatly increase the viscosity, with the result that, owing to the reduced flowability, the working fluid cannot escape or flow out so easily, for example through a small break point in the expansion system resulting in a small leak. In an advantageous configuration of the invention, this may be selected such that the working fluid, as it were, cures or hardens, as a result of which said fluid can no longer escape from the expansion system at all. Alternatively, the activation material can cure or harden. Consequently, not only is a point of a possible leak in the expansion system subjected to bonding and thus sealed, but the working fluid flow is also stopped. This can also be achieved by the changed activation material.

Advantageously, it may be provided that said change of the working fluid takes place in the region of the contact of the working fluid with the activation material. A possible change of the working fluid or of the activation material with regard to flowability may be such that said change also, as it were, spreads out, or continues, within the expansion system or within the working fluid a short distance from the contact region. This expansion may lie in the range from 1 mm to 20 mm, advantageously 2 mm to 10 mm. This is considered to be sufficient for achieving in this way sufficient sealing of the leak in the expansion system.

In a fundamentally different, second configuration of the invention, it may be provided that the activation material, and in particular also the working fluid, is selected such that, upon contact between the two, firstly the volume of the working fluid increases, or alternatively the fluid of the activation material itself. Such an increase in volume is advantageously realized by foaming, that is to say by the formation of gases by a chemical reaction upon contact of activation material with working fluid. It is alternatively possible for a specific increase in volume to be achieved by purely chemical means. Said change in volume should be in total at least 2%, advantageously at least 10% or even at least 30%. It can be up to 100% or even up to 200%, in particular in the case of foaming.

As a result of this increase in the volume of the working fluid in the expansion system, on the one hand there is an increase in pressure, due to which possibly even more working fluid can then discharge from the leak of the expansion system. At the same time, however, as in the case of an increase in temperature, in particular a very rapid and considerable increase in temperature, an expansion receptacle of the expansion system is expanded or triggers a contact process or switching process, which generally serves to switch off a heating device. In this way, for a start, at least the possible risk of an unregulated heating device which continues to operate is avoided. It is then possible for mechanical safety means to intervene, which intervene in the case of such a large expansion and movement and prevent reactivation or no longer allow the heating device to be activated. Alternatively and advantageously, it may be provided that, following the increase in the volume, the flowability is reduced or the viscosity is increased. This in turn brings about a type of blockage or sealing of the leak, as described above, as a result of which it is actually possible for the switching state with deactivation or deactivated of the heating device to be performed permanently or maintained permanently. Advantageously, this can again also be realized to such an extent that the working fluid, which has increased in volume, is hardened or permanently cured. In this way, this state is, as it were, fixed, a heating device regulated by way of the expansion system being permanently switched off.

In both basic configurations of the invention, it is probably the case that the expansion system is destroyed and cannot be restored. It then simply has to be replaced. However, a possible severe fault is reliably prevented, which is considered to be far more important.

In an advantageous configuration of the invention, it may be provided that the activation material is of such a form that it crosslinks the working fluid. For this purpose, the working fluid may preferably be silicone-based, in particular a silicone oil. Such a silicone oil should be a synthetic silicone oil and may for example be polydimethyl phenyl siloxane (in this regard see WO 2006/024451 A1). Such silicone oils are advantageously used for corresponding expansion systems. It may also be for a type of silicone rubber, for which there are three possible crosslinking options for hardening or even curing.

A first crosslinking option is platinum-catalyzed addition crosslinking. Here, Si—H groups of a crosslinker or of the activation material can react with the vinyl groups of the working fluid or of the polymer so as to form a three-dimensional network. Such materials are obtainable for example from the company Wacker Chemie AG. They may be one-component silicone rubber types, which already contain a platinum catalyst, or advantageously simply two-component types. In the case of these, the crosslinker, as activation material, may still be separated from the platinum catalyst in the working fluid. Alternatively, it is possible for a platinum catalyst to be separated from a crosslinker which is already contained in the working fluid. In this case, as may apply generally, it is advantageously provided that the activation material is a coating which may be applied in regions or completely to the expansion system, in particular to the fluid line. It is also advantageously possible for possible connection regions between the fluid line alone and the expansion receptacle and/or the supply receptacle to be provided with the activation material, since a risk of breakage with leaks is still relatively high here. Expansion receptacles and/or supply receptacles themselves may also have the activation material if the latter is a coating.

A further crosslinking option is peroxide crosslinking, in which organic peroxides are used. Said peroxides break down at increased temperature, this being able to be generated by the activation material, into highly reactive free radicals, which bring about the chemical crosslinking of the polymer chains. This gives rise to a highly elastic three-dimensional network. A silicone material is advantageously used for this purpose too. The materials, in particular peroxide crosslinkers in the form of pastes, are obtainable from the company Wacker Chemie AG for this purpose too.

Condensation crosslinking, as a further crosslinking option, may constitute a further alternative change of the working material by the activation material. Here, the terminal hydroxyl groups of the polymer of the working fluid can react with a siloxane crosslinker, with elimination of small volatile compounds such as alcohol, acetic acid or amine. As a result of this elimination, by contrast with the aforementioned addition-crosslinking silicone rubbers, material shrinkage and consequently a reduction of volume of approximately 3% by volume occurs. This condensation-crosslinking vulcanization can be catalyzed by organotin or organotitanium compounds, with absence of or contact with small quantities of water. Possibly, even the air humidity may be sufficient for this purpose. Vulcanization is already possible at room temperature. The company Wacker Chemie AG offers ready-to-use one-component silicone rubbers as RTV-1 types, which already vulcanize under the effect of air humidity, that is to say if the working fluid discharges through the leak. Alternatively, quick-curing two-component types are also obtainable, in the case of which the second required component is then contained in the activation material. This is a coating with which the working fluid comes into contact only if the leak or a break or a hole in the expansion system occurs.

In a further configuration of the invention, it may additionally be provided that the working fluid does not interact with the working material alone, but rather, along with water or air humidity, oxygen brings about and/or additionally intensifies the change of the working fluid or the reaction of the activation material with the working fluid. This can apply both to a change of only the flowability or the viscosity of the working fluid and in particular with regard to a volume.

Having explained the basic processes of a chemical and/or physical nature, it is intended below to discuss how the expansion system can be, as it were, structurally designed. It advantageously has a switching means in addition to the expansion receptacle and the fluid line, which means is mechanically operatively connected to said expansion receptacle. This operative connection is provided for the purpose of actuation of a switching process of the switching means at a settable actuation point, as is generally known of the thermostat mentioned in the introduction. In addition to the working fluid in the expansion receptacle and in the fluid line, the expansion system has an activation material which has the aforementioned properties of bringing about, upon contact with the working fluid or upon mixing with the working fluid, a change with regard to volume and/or flowability or viscosity, in particular for the working fluid itself, but possibly also for itself. In principle, it is possible for the activation material to be added to the working fluid and for the two to react in said manner upon contact with oxygen and/or moisture in the air, if they discharge from the expansion system through a leak and reach the air. Advantageously, the activation material is however not added to the working fluid, but is applied to a surface or a region of the expansion system. As has been discussed above, at least one surface of the fluid line, preferably of the entire fluid line, is possible for this purpose. In addition, it is also possible for regions of a connection of the fluid line to the expansion receptacle, possibly also to a supply receptacle at another free end of the fluid line, to have the activation material. Such a supply receptacle may advantageously be used in a region, or provided at a location, where temperature detection is to be realized, for example relatively close to a heating device. Due to the relatively large quantity of working fluid in said supply receptacle, for example from 0.5 $cm^3$ to 2 $cm^3$ or even up to 10 $cm^3$, in the case of a relatively thin fluid line with an inner diameter of less than 2 mm, an, as it were, intensified expansion and movement at the expansion receptacle can be brought about.

It is possible for the activation material to be applied to the outer side of the expansion system or at least of the fluid line. This firstly facilitates the application of the activation material, and secondly it is thus possible for a possible interaction with air to be improved or even to be made possible in the first place. The activation material may then be applied as a type of lacquer or coating. In the case of hardening or curing of the working fluid, the leak is then, as it were, covered, or sealed off, from the outside.

In a fundamentally different configuration of the invention, the activation material may be provided only within the expansion system. Advantageously here, said material is applied only to an inner side of the expansion system, in particular of the fluid line, but possibly also of the supply receptacle. Such a coating of the inner side with activation material is also possible, albeit possibly slightly more demanding in a technical sense. However, this is also possible. One possibility, in the case of possible direct contact of the working fluid with the activation material, is for a system to be provided, which brings about the change with regard to volume and/or flowability or viscosity only if the working fluid, while in contact with the activation material from the expansion system, discharges at a leak and interacts with oxygen and/or water in the air. Alternatively, a further cover layer should be applied to the coating with activation material on the inner side, which cover layer completely covers the activation material such that the working fluid does not actually come into contact with the activation material during the normal operation of the expansion system. Only if a leak occurs in the expansion system, which leak is then of course also drawn through the coating with activation material and the cover layer, in particular a crack or a break, is it possible for the working fluid, precisely due to the destroyed cover layer, to come into contact with the activation material. Their described interaction then comes into play. The desired change according to the invention in the expansion system can then be brought about, wherein through the provision of the activation material in the inside of the expansion system, an even better interaction with the working fluid in a more direct manner is possible since it is not first necessary for, as it were, action to be realized through the point of the leak into the interior of the expansion system.

In yet a further basic configuration of the invention, it may be provided that an activation material is encapsulated, or formed so as to be enclosed, wherein said material is encapsulated in an outer casing composed of casing material. So-called microcapsules are considered to be particularly advantageous here, which have known diameters of less than 2 mm, in particular less than 1 mm or even less than 100 µm. This encapsulated or enclosed activation material may be present throughout the expansion system, but advantageously at least in any case also in the expansion receptacle. The advantage of the provision in the expansion receptacle is that, there, it is also possible for relatively large encapsulation forms of 1 mm or even 2 mm in size, or even larger, to be used. Said encapsulation is in this case of such a form that the activation material does not come into contact with the working fluid. Advantageously, the encapsulation is also of such a form that, in the case of a reduction in volume of the expansion receptacle beyond a predefined dimension, in particular if two opposite receptacle walls approach one another to a very large extent and beyond said predefined dimension, the encapsulation breaks open or is destroyed. Then, the activation material can discharge from the encapsulation or come into contact with the working fluid and thereby mix with the latter. Said material can then in turn interact such that the volume of the working fluid or the volume within the expansion system, and in particular within the expansion receptacle, is increased. Said increase in volume has been described in the introduction as being at least 2%, preferably at least 10%. In this way, switching of aforementioned switching means for switching off a heating device or the like may be provided as a safety measure, whereby a direct hazard situation can be eliminated. Advantageously, it may then be provided that the flowability of the working fluid is greatly reduced or the viscosity is greatly increased, possibly after the breaking-open of further, in particular smaller, encapsulations with activation material therein, which in particular occurs as a result of the increase in volume itself. Alternatively and/or additionally, the increase in volume may be irreversible, with the result that, even in the case of further flowing-out of the working fluid from a leak somewhere in the expansion system, the expansion receptacle itself does not, owing to a pressure drop in the interior, contract again. This allows, as it were, the increase in volume to be made fixed or unchangeable, as a result of which the expansion receptacle cannot contract or be reduced in size again for possible renewed activation of a switching means for activating a heating device.

Here, it is possible that, during the interaction of activation material and working fluid, the working fluid itself increase in volume, for example foams. Alternatively, it is also possible for the activation material to increase in volume or to foam, this leading to the same objective, namely the desired increase in volume overall within the expansion system.

In an aforementioned possible configuration of the invention, it may be provided that the expansion receptacle has a closable opening through which encapsulated activation material may be introduced. This is advantageous in particular if said encapsulated material lies tends to lie in the upper size range mentioned above, that is to say has for example a diameter of 1 mm or more. Possibly then, an introduction via a connected fluid line into the expansion receptacle would no longer be possible. Advantageously, the opening is closable in such a pressure-tight manner that it can withstand a pressure which is at least 20% higher than the working pressure of the expansion system. However, since otherwise a renewed opening is considered to be no longer necessary, use may advantageously be made of corresponding latching and effectively sealing locks.

These and further features will emerge not only from the claims but also from the description and the drawings, wherein the individual features may each be realized individually or severally in the form of sub-combinations in an embodiment of the invention and in other fields and constitute advantageous and independently protectable embodiments, for which protection is claimed here. The division of the application into individual sections and intermediate subheadings does not mean that the statements made under these are restricted in terms of their general applicability.

BRIEF DESCRIPTION OF THE DRAWINGS

Exemplary embodiments of the invention are schematically illustrated in the drawings and will be explained in more detail below. In the drawings:

FIG. 2 shows, in four steps, sectional illustrations through a fluid line of the expansion system from FIG. 1, with a layer of activation material on the outside, upon the occurrence of a crack, FIG. 3 shows, in four steps, sectional illustrations through a further fluid line from FIG. 1, with a layer of activation material on the inside, upon the occurrence of a crack, FIG. 4 shows, in four steps, sectional illustrations through a further fluid line from FIG. 1, with a layer of activation material on the inside which is further covered inwardly by a cover layer, upon the occurrence of a crack.

DETAILED DESCRIPTION OF THE EXEMPLARY EMBODIMENTS

Figure 1:
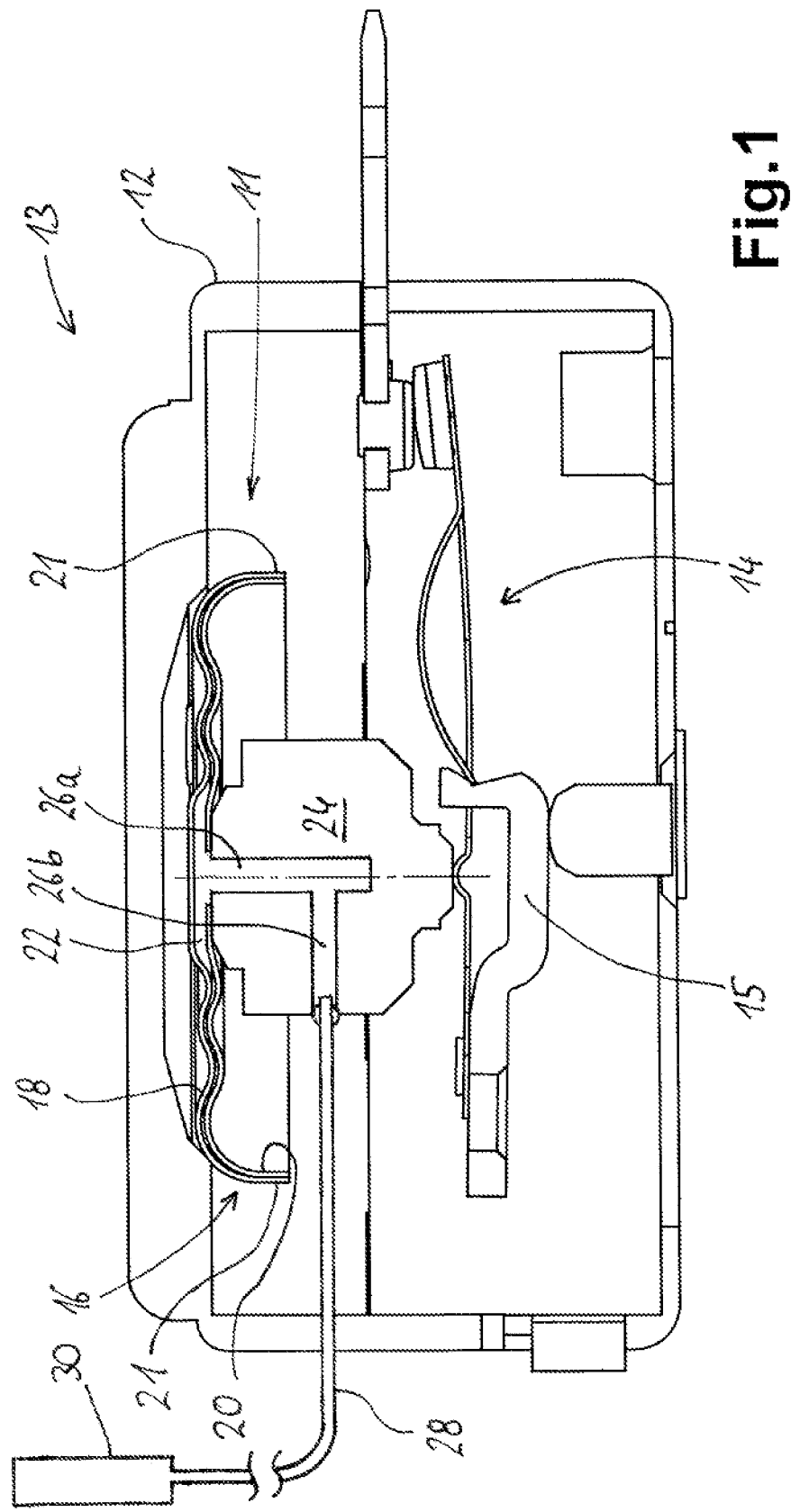
FIG. 1 shows a simplified sectional illustration through a thermostatic switch, which has the expansion system according to the invention and a switching spring.

FIG. 1 shows an expansion system 11 according to the invention in a housing 12 of a thermostatic switch 13. This is intended to correspond in principle to a thermostatic switch known from the prior art, as is also known as a temperature regulator from, for example, the aforementioned U.S. Pat. No. 4,260,977 A. In this way, it is advantageously possible for a baking oven or its heating device to be regulated. The thermostatic switch 13 has, as a switching means, a switching spring 14 on which an expansion receptacle 16, consisting of a first shell 18 at the top and a second shell 20 at the bottom, acts. An interior space 22 is formed between the first shell 18 and the second shell 20, with the result that a type of cell is formed. Fastened to the lower second shell 20 is a pressure piece 24 which acts or presses on the switching spring 14 and, for this purpose, bears against the latter. It can be easily seen from FIG. 1 that a slight movement downward of the pressure piece 24, because the second shell 20 has also moved downward, causes the switching spring 14 to open. The switching spring 14 is in the form of a snap spring, as is also known from the aforementioned prior art. The expansion travel may in practice amount to 1 mm or 2 mm. By means of the upper switch 17, the expansion receptacle 16 is arranged fixedly in the housing 12, in particular in a central region of the upper first shell 18, with the result that the upper first shell 18 remains positionally fixed during expansion of the expansion receptacle 16. Consequently, primarily movement of the second shell 20 during expansion of the expansion receptacle 16 downward, and thus also of the pressure piece 24 fastened centrally thereto, occurs.

In the interior, the pressure piece 24 has a vertical inner bore 26a and a horizontal inner bore 26b which merges therein and which emerges from the pressure piece 24 to the left. Coming from the left, a fluid line 28 a piece is inserted into said inner bore 26b and fixedly and sealingly connected, for example fixedly soldered or fixedly welded, to the latter. Alternatively, there may also be a sealing compression. This is known in each case.

The fluid line 28 leads out of the housing 12 of the thermostatic switch 13 to the left with an intrinsically possible large length. This length may be between 10 cm and 1 m or 2 m, in some cases even more. The outer diameter of the fluid line may be approximately 2 mm and the inner diameter thereof may be approximately 1 mm. Said line can thus be considered to be a type of capillary tube. Said line advantageously consists of metal which is able to be bent easily.

Provided at the end of the fluid line 28 is a supply receptacle 30 which can also be considered to be the primary sensor for temperature detection. The supply receptacle 30 may for example be 3 cm to 5 cm long and have a diameter of 5 mm to 10 mm. It also consists of metal, and so the fluid line 28 can be soldered or welded to it in a transition region.

It can be seen from FIG. 1 that the expansion system 11 has continuous interconnection in the interior of expansion receptacle 16, pressure piece 24, fluid line 28 and supply receptacle 30. A working fluid, according to an aforementioned configuration, is introduced into this interior space such that it completely fills this interior space without air pockets. As has been described in the introduction, the volume of the working fluid is changed in a manner dependent on the temperature, the volume being increased in the case of increasing temperature and being decreased in the case of decreasing temperature. In a known manner and with fixing of the expansion receptacle 16 in the center of the upper first shell 18, this brings about a movement of the pressure piece 24 downward, or toward the switching spring 14, in the case of an increase in temperature, with the result that, from a specific point, it actuates, and thus opens, said spring. The situation is exactly reversed in the case of a reduction in temperature. A known temperature regulation by means of the thermostatic switch 13 is realized precisely in this way. It is possible in a manner not indicated for the relative position between the expansion receptacle 16 or the central region of the upper first shell 18 and the switching spring 14 or a holder 15 bearing the latter to be changed, for example by a rotary knob (not illustrated). This allows the switching point of the switching spring 14 to be set to a desired temperature.

Figure 5:
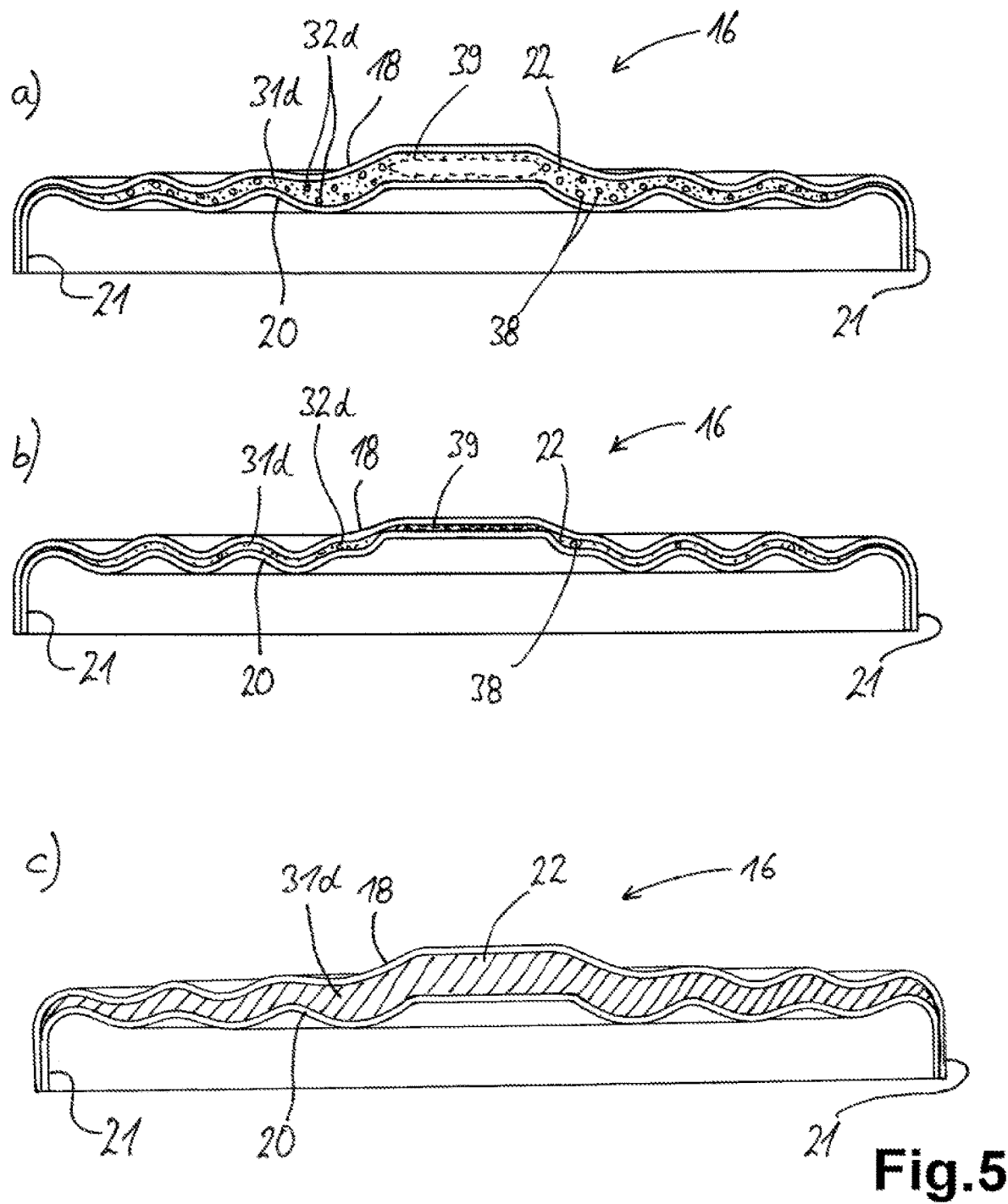
FIG. 5 shows, in three steps, an enlarged sectional illustration through the expansion receptacle of the expansion system from FIG. 1 upon the occurrence of a leak in the expansion system.

Below, the different basic configurations of the invention, as have been described above, are explained on the basis of the figures. FIGS. 2 to 4 show the first basic configuration of the invention, in which an activation material is applied to an outer side or an inner side of the fluid line 28. FIG. 5 shows the other, second basic configuration of the invention, in which there is provided encapsulated activation material in the expansion receptacle 16 itself, together with the working fluid.

A section through an intact fluid line 28, which is used in the expansion system 11 in FIG. 1, is illustrated at the very top in FIG. 2a). The fluid line 28a consists just of metal and has a layer 32a of activation material on its outer side. Said layer 32a covers the fluid line 28 over its entire periphery and along its entire length, advantageously also covers the supply receptacle 30 or at least a connection thereto, and also covers as far as possible a connection of the fluid line 28 to the pressure piece 24. In the interior of the fluid line 28 is working fluid 31a, advantageously a silicone oil, as has been mentioned by way of example in the introduction. The activation material 32a and the working fluid 31a are of such a form that, directly upon interaction or mixing with the working fluid 31a, the flowability of the working fluid 31a is greatly reduced or its viscosity is greatly increased. This may be realized by platinum-catalyzed addition crosslinking or addition crosslinking catalyzed by other catalysts, by peroxide crosslinking or by condensation crosslinking, as has been explained in the introduction. The corresponding specific crosslinkers are obtainable for example from the company Wacker Chemie AG, as has been stated above.

If a leak, which is illustrated as a crack 34a in FIG. 2b), occurs at an arbitrary point in the fluid line 28, then first of all here the result is a discharge 35a of working fluid 31a. This comes about especially due to the relatively large inner pressure within the expansion system 11. Since the crack 34a passes through both the fluid line 28a itself and through the layer 32a of activation material provided on the outside thereof, the discharging working fluid 31a comes into contact with said activation material 32a. The explained crosslinking of the working fluid 31a can thus be initiated. This is illustrated in FIG. 2c) such that, here, the working fluid 31a not only becomes more viscous or less flowing, but even hardens. As a result, a plug 36a is formed, which closes off the crack 34a. Here, it can be seen that the action of the crosslinking continues into the interior of the fluid line 28a and thus at least also into the working fluid 31 which is present in the immediate vicinity. As a result, this plug 36a is widened on the inner side of the crack 34a, which prevents said plug being forced out in an outward direction as a consequence of a possible increase in pressure in the interior space. The crack 34a is thus sealed off, and, apart from a small, as it were, lost quantity of working fluid 31a, the expansion system 11 would in this case again be ready for use. The small loss of working fluid 31a brings about, as it were, a temperature adjustment, this however as a rule not yet becoming so large that a hazardous state could suddenly arise at a heating device (not illustrated here) which is operated by the thermostatic switch 13, for example in a baking oven.

In FIG. 2d), it is further illustrated as a possible extension that the crosslinking of the working fluid 31a does not necessarily have to stop in the vicinity of the crack 34a, but can expand inwardly, as it were like an intensified reaction or even a type of chain reaction. If then the entire interior of the fluid line 28 is filled with viscous working fluid 31a, possibly even with hardened working fluid, it may be the case that the expansion system 11 no longer operates. In this case, it is advantageous if, in addition to the change in the flowability or viscosity of the working fluid 31a, an increase in volume of the working fluid is realized during said change. As a result, the switching spring 14 can be opened, as shown by looking at FIG. 1. An increase in volume of the working fluid of a few percent, for example 1% to 5%, is sufficient for this purpose. If then this working fluid, which has increased in volume and has opened the switching spring, is also, as it were, hardened, then this state is, as it were, fixed and the switching spring 14 remains open. This would thus be a fault, with the result that the thermostatic switch 13 is no longer operable or usable. However, it is a safe or non-hazardous fault.

For the function according to FIG. 2 of the interaction of the working fluid 31a with the layer 32a of special activation material, it is possible in a possible extension to further provide that the change of the working fluid 31a is assisted in that the working fluid ultimately comes into contact with air. This allows the change to be actually brought about, or reinforced, by oxygen and/or water in the air.

FIG. 3 illustrates a fluid line 28b in a manner similar to the case illustrated in FIG. 2, said fluid line however being provided with a layer 32b of activation material on its inner side. A working fluid 31b is introduced (see FIG. 3a)).

If then, according to FIG. 3b), a crack 34b in the fluid line 28b occurs, which crack then of course also runs inwardly through the layer 32b, working fluid 31b discharges and in turn forms a discharge 35b. Working fluid 31b discharging in this region can transport with it particles or molecules of the layer 32b of activation material to the outside, where this mixture comes into contact with air or oxygen and water. In this case, the working fluid 31b and the activation material of the layer 32b are of such a form that, upon contact with oxygen and/or water, they bring about the change according to the invention of the working fluid 31b. In this way, it is possible for the flowability of said fluid to be reduced or for the viscosity thereof to be increased. This can be realized to such an extent that a plug 36b is in turn simply formed, which covers the crack 34b inwardly and thereby seals it off. According to FIG. 3d), this can even be realized to such an extent that a major part of the, or the entire, working fluid 31b is changed or hardened at least over a specific longitudinal region close to the crack 34b. As described above with regard to FIG. 2d), this advantageously occurs together with an increase in the volume of the working fluid or with an expansion.

A configuration of the invention which is again somewhat different is illustrated in FIGS. 4a) to 4d). According to FIG. 4a), a fluid line 28c composed of metal is here coated on its inner side with a layer 32c of activation material, in a manner similar to that which has been explained with regard to FIG. 3. However, said layer 32c is further completely coated inwardly by a cover layer 33c. This cover layer 33c may in principle be of variable formation, it merely being important here that it does not interact with the layer 32c of activation material and also does not interact with the working fluid 31c. Furthermore, it must not be permeable to the working fluid 31c.

If then, according to FIG. 4b), a crack 34c again occurs in the fluid line 28c, and also in the layers 32c and 33c, then working fluid 31c in turn discharges. The result is the known discharge 35c. Since the crack 34c also runs through the cover layer 33c and, as it were, opens the latter, the working fluid 31c can come into contact with the layer 32c of activation material, or be mixed with molecules or particles from there, on the way into the crack 34c. This can then lead, with a reaction similar to that described with regard to FIGS. 2a) to 2d), to hardening of the working fluid 31c or to the flowability of the working fluid 31c being greatly reduced or the viscosity thereof being greatly increased. In this way, the plug 36c illustrated in FIG. 4c) can in turn be formed. This can solidify and should in any case reliably seal off the crack 34c.

As is illustrated in FIG. 4d), it is possible in a manner corresponding to FIG. 2d) for a continuous change of the working fluid 31c to take place in a relatively large region around the crack 34c. Advantageously, this also results in the above-described expansion or increase in volume for performing the switching process at the switching spring 14.

In the exemplary embodiment in FIG. 4, the working fluid 31c and layer 32c of activation material may be selected as in FIG. 2. The cover layer 33 may for example be a protective lacquer or a resin layer.

If in the exemplary embodiment in FIG. 4 a reaction between working fluid and activation material takes place in the layer 32c very rapidly or so rapidly that no plug 36c projecting outwardly is able to form at all, this is also not a problem. Ultimately, the crack 34c is in any case closed off and sealed as far as possible by the plug 36c, which then substantially projects inwardly.

FIG. 5 describes the second basic configuration of the invention, in which the activation material is encapsulated or formed so as to be enclosed. FIG. 5a) shows an enlargement of the expansion receptacle 16 from FIG. 1, albeit only the expansion receptacle 16 without a pressure piece 24 or the like. The upper first shell 18 and the lower second shell 20 are fixedly connected to one another in the encircling edge region 21, as is also shown by a comparison with FIG. 5b) and FIG. 5c).

An interior space of the expansion receptacle 16 is filled with working fluid 31 d, which is identifiable by the illustration with the small dots. At the same time, round microcapsules, which are illustrated to be slightly larger, are also introduced here, the diameter of which may be 200 μm to 400 μm. One possibility is for the microcapsules 38 all to be the same and to contain an activation material 32 d which, upon mixing or contact with the working fluid 31 d, brings about the change according to the invention of the flowability or viscosity of the working fluid. Such materials have been described above. A casing material of the outer casing of the microcapsules 38 may consist of a suitable material.

Possibly, in addition to the microcapsules 38, a catalyst material may be introduced into the working fluid 31d. This catalyst then brings about, together with the activation material 32d in the microcapsules 38, the stated change. The activation material can then be similar to that described above with regard to FIG. 2. A catalyst may be platinum-based or contain platinum.

Alternatively, in FIG. 5a), a large capsule 39 is illustrated by way of dashed lines in the central region. This may have a thickness of approximately 1 mm and a diameter of 2 mm to 4 mm. Its thickness is selected such that, during the normal operation of the expansion system 11 in the thermostatic switch 13, the two shells 18 and 20 do not approach one another so as to be closer than this thickness, with the result that the large capsule 39 is not destroyed during normal operation. Said capsule may be provided on its own or with the microcapsules 38.

FIG. 5b) illustrates what happens if a crack or a leak in the expansion system 11 has occurred and, in the process, a relatively large quantity of working fluid 31d has discharged. Then, the expansion receptacle 16 collapses to a relatively large extent or the two shells 18 and 20 approach one another to a large extent. Transferred to FIG. 1, this causes the pressure piece 24 to be raised considerably upward and away from the switching spring 14, and so the latter is a long way from being opened. If this state remains, then a heating device which is operated by way of the thermostatic switch 13 is no longer shut off, even when this should actually take place. This results precisely in an above-described critical or even hazardous situation.

Consequently, the activation material 32d is selected here such that, together with the working fluid 31, possibly together with a catalyst which has been mentioned, it brings about an expansion or increase in volume of the working fluid 31. Specifically, if the two shells 18 move together to such an extent according to FIG. 5b), then these microcapsules 38 are crushed or break open and the activation material 32d is mixed with the working fluid 31. As described, this brings about the increase in volume of the latter, this being of considerable extent here, for example doubling the volume. As a result, the two shells 18 and 20 of the expansion receptacle 16 are in turn pushed apart to a very large extent, further than in FIG. 5a), as can be seen in FIG. 5c). Furthermore, it should then be provided that the working fluid 31 is hardened or either can no longer discharge to the leak or else can no longer exit the expansion receptacle 16 in order that working fluid 31 is not again pushed outward through the leak to a relatively large extent, as a result of which a collapse of the expansion receptacle 16 could again be brought about. Possibly, it may also be fully cured. Then, the switching spring 14 according to FIG. 1 remains in the open state. Although an electrical device provided with the thermostatic switch 13 can then no longer operate or no longer heat by way of the heating device activated thereby, a hazardous situation can be avoided as a main objective.

It can be seen from the comparison of FIGS. 5a) to 5c) that the advantage of the use of a single large capsule 39 is that this can be introduced in a predefined manner in the central region of the expansion receptacle 16, for example through a closable opening (not illustrated here), for example closable by way of attachment with the pressure piece 24. For the crushing of said large capsule 39, a reduction of the spacing of the two shells 18 and 20 is in this region is sufficient. However, known and easily predictable conditions prevail here. Thus, is it especially possible to avoid the situation in which microcapsules 38 situated close to the edge region 21 in the radially outer regions of the inner space 22 are already inadvertently destroyed during normal operation and, as it were, by activation of the safety function, can render the expansion system 11 unusable.

In yet a further configuration of the invention, it may be provided that two different activation materials are contained in the microcapsules 38. For example, these could be in each case soda and vinegar. After the breaking-open of the microcapsules, these are mixed and bring about a reaction for the formation of gas, in particular carbon dioxide. In this way too, as it were, the volume in the interior space 22 is increased, or the working fluid 31d can, as it were, be foamed and thus undergoes a significant increase in volume.

Alternatively, it is possible for a one-component PU foam to be contained in the one type of microcapsules and for water to be contained in the other type of microcapsules. This is possible when the PU foam is selected such that it foams upon contact with water, as is known of PU foams for sealing doors and windows during installation, which are already activated for foaming by the air humidity.

Furthermore, it is also possible for two-component PU foams to be used, for which purpose a PU material may be contained in the one type of microcapsules and a hardener for this may be contained in the other type of microcapsules. The breaking-open thereof is in each case realized as described above. After the breaking-open and mixing, the PU foam hardens, said foam beforehand advantageously foaming and increasing its volume as described above.

The invention claimed is:

1. An expansion system for temperature detection by means of thermomechanical expansion and movement, having:
   an expansion receptacle,
   an elongate fluid line which is connected in a fluid-conducting manner to said expansion receptacle,
   a switching means which is mechanically operatively connected to said expansion receptacle for a purpose of actuation of a switching process of said switching means at a settable actuation point,
   a working fluid in said expansion receptacle and in said fluid line,
   an activation material being formed to change, upon contact with said working fluid or upon mixing with said working fluid, said working fluid with regard to a volume of said working fluid.

2. The expansion system according to claim 1, wherein said activation material is of such a form that, together with oxygen and/or water, it brings about said change of said working fluid.

3. The expansion system according to claim 1, wherein said activation material is of such a form that, together with a catalyst, it brings about said change of said working fluid.

4. The expansion system according to claim 3, wherein said catalyst is platinum.

5. The expansion system according to claim 1, wherein said activation material is not added to said working fluid but is applied to a surface of said expansion system.

* * * * *